Oct. 20, 1936.  M. SCHANKIN  2,058,181
VEHICLE BODY
Filed June 21, 1935
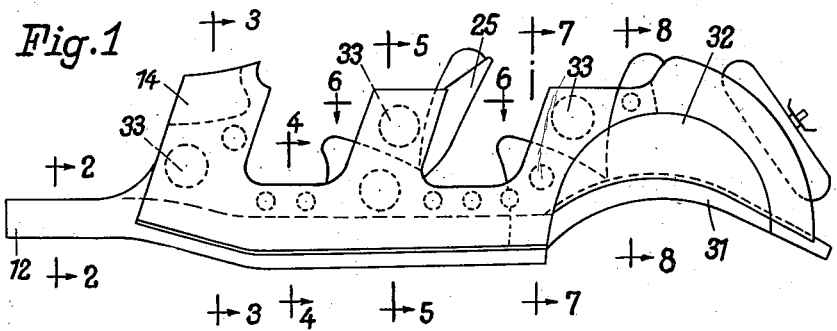
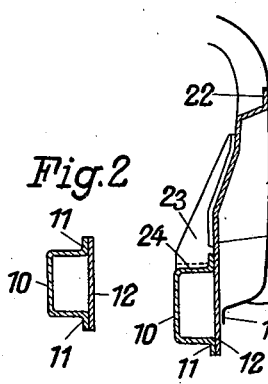
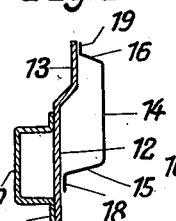
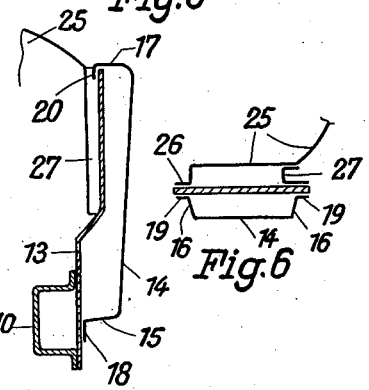
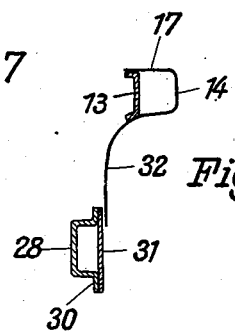
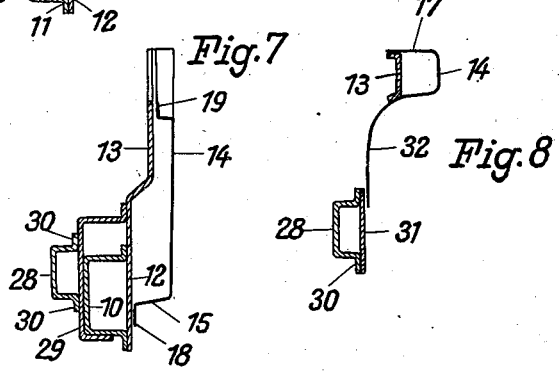
INVENTOR
MAX SCHANKIN.
BY John P. Tarbox
ATTORNEY Patented Oct. 20, 1936

2,058,181

UNITED STATES PATENT OFFICE 2,058,181

VEHICLE BODY

Max Schankin, Johannisthal, near Berlin, Germany, assignor to firm Edward G. Budd Manufacturing Company, Philadelphia, Pa.

Application June 21, 1935, Serial No. 27,637
In Germany June 9, 1934

7 Claims. (Cl. 296—28)

The invention relates to bodies, especially for motor vehicles, with box section longitudinal sills which preferably form simultaneously the longitudinal chassis sills. The construction according to the invention is designed to yield an extraordinarily intimate connection between the longitudinal sills and the side walls of the body and to impart a great strength and stiffness to the side walls while saving weight as much as possible and whereby the body walls on their part contribute to an especially high degree to the strength and stiffness of the underframe structure.

The invention resides partly in the fact that one vertical wall of the box section longitudinal sill is upwardly extended so as to form the framing of the lateral body wall or a part of the same. Preferably the outer wall of the longitudinal sill is according to the invention upwardly extended to form the inner framing structure for the body side wall.

According to a further feature of the invention the extension of the longitudinal sill forms the essential part of the supporting skeleton framing for the outer shell of the body, said shell being suitably arranged spaced in its body from the upwardly extended wall of the longitudinal sill and being connected to the sill wall by flanges inwardly bent off from the margins of the shell, which flanges form the door jamb faces around the door openings.

Further features of the invention will become apparent from the embodiment illustrated in the drawing and described in the following.

The drawing shows schematically;

In Fig. 1, a side elevation of a body according to the invention and in Figs. 2–8, sections respectively on lines of Fig. 1 of corresponding number.

From the forward end of the vehicle up to the rear wheel housing the lateral longitudinal sills consist of a channel-shaped, outwardly opening sheet metal rail 10. The height of this rail 10 varies but relatively slightly in its entire length. Narrow flanges 11 are bent off from the free margins of the rail 10 and a sill sheet 12, forming the outer wall of the longitudinal sills is connected, preferably by spot welding, with said flanges 11.

The wall 12 has first of all within the body proper, upward extensions 13. These extensions form a part of the body wall, viz. in the embodiment they form the essential part of the supporting skeleton structure for the outer shell 14 suitably consisting likewise of sheet metal. The outer shell 14 has along its margins flanges 15, 16 and 17 directed toward the longitudinal middle plane of the car and the margins bordering the door openings form the jamb faces of the doors. Along the lower edge and around the door openings the inturned flanges 15, 16 are suitably continued by laterally outwardly bent off flanges 18 or 19 respectively, by means of which the outer shell is secured, preferably by spot welding, to the outer sill sheet 12, 13. The upper flange 17 is, however, suitably continued by a laterally inwardly bent off flange 20 which is likewise secured to the sill sheet 13 (see Fig. 5).

At other places, especially within the cowl, the sill extension 13 has along its upper edge an outturned flange terminating in a marginal flange 22, which overlaps the outer shell and is connected therewith (see Fig. 3).

For the purpose of bracing of the upper parts of the side walls of the body, supporting angle brackets 23 are inserted between the top wall 24 of the longitudinal sill and the extension 13 of the wall at especially strained regions, for instance near the front edge of the front door (see Fig. 3). These parts of the body wall lying on different sides between the two door openings are interbraced by the seat back supporting metal panel 25 which is forwardly extended up to the rear edges of the front doors and there connected with the wall portion 13 by outwardly and forwardly bent off flanges 26. A rail 27 is inserted between the front edge of the rear door and the panel 25 (see Fig. 6).

The front section of the longitudinal sills ending at the wheel housing is continued by a correspondingly shaped rail 28. The front end of this rail 28 is secured to the vertical inner wall of the sill section 10 with its marginal flanges 30 overlapping and secured to a likewise channel-shaped intermediate piece 29. The end of the rail 28 projecting beyond the section 10 and the intermediate piece 29 are closed by a separate sheet metal part 31 so that a box section sill is extended through this region also.

The wheel housing 32 is connected with the beam 28, 31 (see Fig. 8). Eventually wheel housing and outer wall of the beam 31 may be formed out of one piece. In the shown embodiment the wheel housing 32 is formed by the outer shell 14 and the upward extension 13 of the outer wall of the front beam section is partially continued rearwardly beyond the wheel housing. This extension of the wall 13 is connected on the one hand with the crown of the wheel housing 32 and on the other hand with the upper marginal flange 17 of the outer shell 14.

Cross sills of necessary number and strength are arranged between the side walls of the longitudinal sills preferably below the seats and along the front edge of the cowl. The wall portions or sill extensions 13 have at suitable points perforations 33 for decreasing of weight and for facilitating the introduction of the welding electrodes to secure the parts together. A relatively heavy coarse metal sheet, for instance of 2 mm. thickness is suitably used for the channel-shaped sill sections and the upwardly extended walls 12, 13. For the outer shell 14, however, are suitably used light drawing sheets, for instance of 0.9 mm. thickness.

Of course, numerous modifications of the invention, particularly of the illustrated and described embodiment, are possible. It may for instance be advisable to continue the wall 31 of the rear sill section upwardly to the flange 17 and to form at the outer shell only the crown of the wheel housing which is then secured to this extension. Furthermore in some instances, particularly for vehicles with front wheel drive, the longitudinal sill may be extended without interruption up to the rear end of the body. Finally numerous of the connecting flanges, for instance the flanges 11, 18, 19, 26 may be arranged in the opposite direction to that shown in the drawing, especially if it is desired that they shall be invisible.

What I claim as new and useful is:

1. A body, particularly for motor vehicles, comprising a box section lower longitudinal sill serving also as a longitudinal chassis sill and having vertical walls, the sill being fabricated of sheet metal parts rigidly united and one of its vertical walls being upwardly extended a substantial distance above the box section to provide inner framing for part at least of the side wall of the body, and an outer shell secured to said inner framing.

2. A body according to claim 1, in which the outer vertical wall of the longitudinal sill is upwardly extended to constitute a substantial part of the inner framing of the body side wall.

3. A body according to claim 1 in which the essential part of the inner supporting framing structure for the outer body shell parts is formed by said upward extension of the sill wall, and an outer shell arranged in bodily spaced relation from the upward extension of the sill wall and secured thereto through inwardly extending flanges in the margins thereof.

4. A body according to claim 1 in which the essential part of the inner supporting framing structure for the outer body shell parts is formed by said upward extension of the sill wall, and an outer shell arranged in bodily spaced relation from the upward extension of the sill wall and secured thereto through inwardly extending flanges in the margins thereof, said flanges forming the door jamb faces around the door openings.

5. A body according to claim 1 in which the essential part of the inner supporting framing structure for the outer body shell parts is formed by said upward extension of the sill wall, said extension in the wheel house region being extended rearwardly over at least a portion of said wheel housing and connected along its lower edge to the crown of the wheel housing.

6. A body according to claim 1 having braces inserted in the angle between the top wall of the longitudinal sill and the upward extension of its side wall, said braces being located at regions of maximum strain.

7. A body, particularly for motor vehicles, comprising a box section lower longitudinal sill forming also a longitudinal chassis sill, the sill parts consisting of relatively heavy coarse sheet metal rigidly united and comprising vertical walls, and one vertical wall of the sill being upwardly extended to form the essential parts of the inner framing of the body, in combination with a light gauge outer finishing shell bodily spaced from the upward extension of the sill wall and flanged inwardly in its margins and secured to the sill wall and its extension.

MAX SCHANKIN.